Jan. 3, 1956 H. M. STUELAND 2,729,349
CONTROL MECHANISM FOR MOUNTING ON A MOVABLE SUPPORT
Original Filed March 29, 1951 3 Sheets-Sheet 1

*INVENTOR.*
H. M. STUELAND
BY
ATTORNEYS

Jan. 3, 1956  H. M. STUELAND  2,729,349
CONTROL MECHANISM FOR MOUNTING ON A MOVABLE SUPPORT
Original Filed March 29, 1951  3 Sheets-Sheet 2

INVENTOR
H. M. Stueland

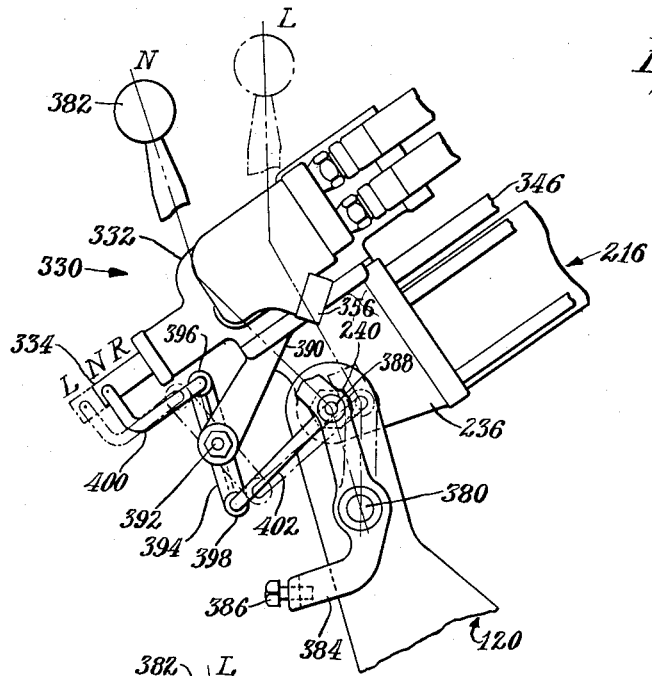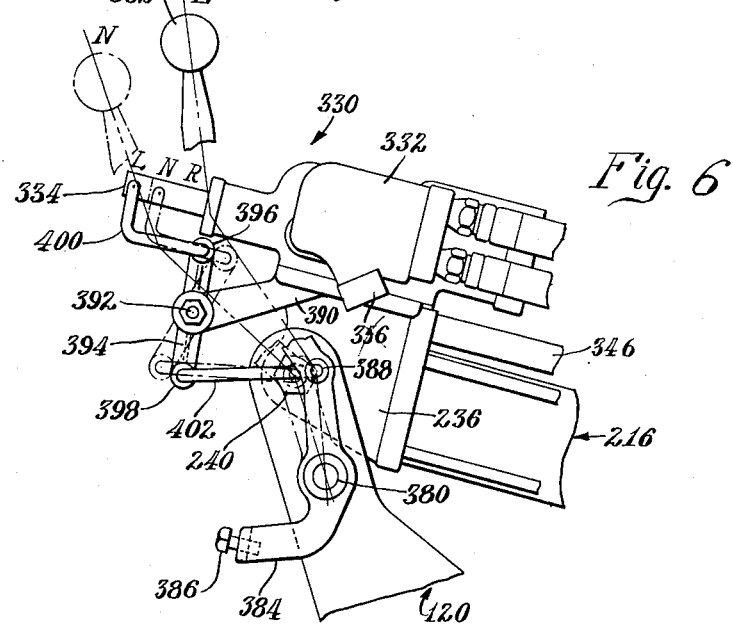

United States Patent Office 2,729,349
Patented Jan. 3, 1956

2,729,349

CONTROL MECHANISM FOR MOUNTING ON A MOVABLE SUPPORT

Harold M. Stueland, East Moline, Ill., assignor to Deere & Company, Moline, Ill., a corporation of Illinois Original application March 29, 1951, Serial No. 218,105, now Patent No. 2,679,943, dated June 1, 1954. Divided and this application June 29, 1953, Serial No. 364,558

8 Claims. (Cl. 214—140)

This application is a division of copending application, Serial No. 218,105, filed March 29, 1951, now Patent No. 2,679,943, and the invention relates to a load-moving machine and more particularly to such machine as embodied in a tractor-mounted loader of the type that has found such wide acceptance on farms for the handling of manure, dirt, gravel, and other materials.

A typical tractor-mounted loader comprises a load-bearing element in the form of a boom, usually comprising a pair of longitudinal arms, one at each side of the tractor, and connected to the tractor for swinging of the front end of the boom from a lowered or working position to a raised or loading position. The material-handling element comprises a scoop or bucket which is preferably carried by the forward end of the boom and has a level position while digging. The scoop is mounted for swinging to a tilted position so that the material carried thereby may be dumped into a vehicle or at some location apart from the place from which it was dug.

It is the principal feature of the invention to utilize a control system having a control member which may be moved from a neutral position to an active position to cause power means to raise the boom. The control mechanism includes a control housing or equivalent structure mounted for swinging movement about a transverse pivot as the boom structure raises. It is an object of the invention to arrange the control lever in such manner that it remains substantially in its active position even though the control device to which it is connected moves through a relatively wide angular range as the boom structure raises and lowers. In this respect, it is an object of the invention to arrange the control lever for movement in the natural direction, either forwardly or rearwardly, so that the operator has the feel or touch necessary to efficient operation of the machine. This phase of the invention utilizes the improved control mechanism in conjunction with a hydraulic power system in which the control member operates a shiftable valve. The hydraulic system includes one or more fluid motors, each of which is mounted for swinging about a transverse axis as the boom raises or lowers. At least one of the hydraulic motors has fixed thereto for movement therewith a control valve including a valve part shiftable selectively back and forth relative to the control housing but at the same time bodily movable with the housing as the housing moves with the cylinder. The control member is related to and interconnected with the valve in such manner that the pivot of the connecting means to the lever is at all times coincident or substantially coincident with the pivot about which the motor and valve housing move.

The foregoing and other important objects and desirable features inherent in and encompassed by the invention will become apparent as the invention is fully disclosed in the following detailed description and accompanying sheets of drawings in which:

Figs. 3 through 6 are fragmentary views, each on an enlarged scale, showing successive steps in the operation of the control mechanism.

Figure 1:
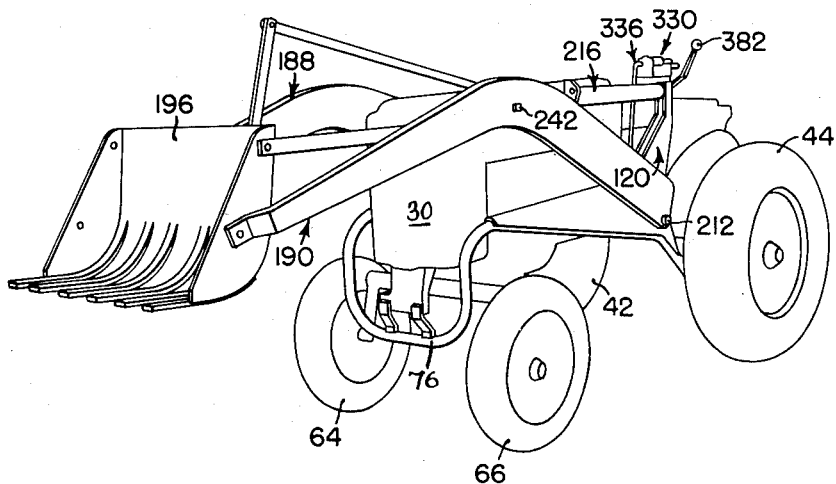
Fig. 1 is a three-quarter perspective view taken from the opposite side of the machine, with the bucket shown in an intermediate raised position.

Reference herein to the machine as having right- and left-hand sides is made with respect to the position of an observer standing behind the machine and facing forwardly. For the purposes of brevity, there will also be used such expressions as "front" and "rear" and "upper" and "lower." It should be understood, however, that the description in this respect is not intended to mean that the parts cannot be otherwise arranged.

Also, the invention is disclosed in connection with a tractor of one well-known type. Obviously, the general principles of the invention may be utilized in connection with loaders mounted on other tractors or even with loaders mounted on supporting frames other than the base provided by a tractor.

The tractor comprises a longitudinal body 30 carried at its rear end by right- and left-hand traction wheels 42 and 44 and at its front end by right- and left-hand steerable wheels 64 and 66 respectively.

The loader has a frame 76 of elongated U-shaped construction having front and rear portions attached to the front and rear portions of the tractor body. The longitudinal members of the frame 76 are provided at their rear ends with upright supports, only one of which is visible at 120. The boom structure for the loader comprises right- and left-hand longitudinal arms 188 and 190, each of which is pivoted at its rear end to the frame structure 76 on a transverse pivot 212, and the boom arms have at their forward ends a bucket or scoop 196.

The boom structure 188—190 is raised by power supplied by a pair of fluid motors, only one of which is visible at 216.

The motor 216 includes an upper mounting or bracket portion 236 by means of which a pivotal connection is effected at 240 (Figs. 3 through 6), and the free end of the associated piston rod is pivotally connected at 242 to the left-hand boom arm 190.

The high-pressure side of a conventional pump (not shown) is connected by a conduit 328 to a control device 330, here in the form of a distributing valve housing 332 having a shiftable part or valve member 334. The valve member has three positions; namely, neutral, raise and lower, which are designated respectively by the letters N, R and L. The valve housing 332 has a central valve bore 338 in which the valve member 334 is reciprocable and the forward portion of the valve housing is provided with centering spring means 340 for the purpose of resiliently maintaining the neutral position of the valve member.

Figure 2:
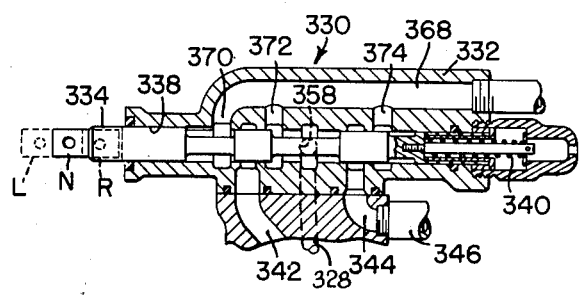
Fig. 2 is a longitudinal sectional view, on an enlarged scale, of the valve means for the hydraulic system.

As best shown in Figs. 1 and 3 through 6, the control device 330 is mounted directly at and on the rear end of the left-hand motor 216 and the rear end of this motor has a pair of passages 342 and 344 leading to the valve bore 338. The passage 342 communicates directly with the proximate end of the motor and the passage 344 communicates by a conduit 346 with the remote or forward end of the motor. The high-pressure line 328 is connected to the valve bore 338 by means of a port 358 intermediate the passages 342 and 344. Since both the right- and left-hand motors operate in parallel, the valve bore 338 has other motor ports for the other motor (not shown), but these are omitted in the interests of brevity. The valve housing 322 has parallel to the valve bore 338 an elongated reservoir passage 368 connected by three ports 370, 372 and 374 with the valve bore 338. These ports are selectively connectible with the motor and pump in a manner to be presently described. In that description, the presence of the right-hand cylinder will be ignored in the interests of clarity. The valve member 334 is of the spool type and has the three positions designated L, N and R in Fig. 2. When it is desired to effect raising of the boom structure 188—190 by means of the fluid motors, the valve member 334 is shifted forwardly, continuing its blockade on the reservoir port 374 and connecting the pump port 358 with the motor passage 344 to supply fluid via the conduit 346 to the front end of the motor 216. When the boom reaches the height desired, the operator releases pressure on the valve member 334 and the centering spring means 340 returns the valve member to neutral, resulting in holding the boom structure at the desired height, since the motors again become hydraulically locked.

Lowering of the boom structure is effected by a shifting of the valve member 334 rearwardly to its "L" position, which connects all three reservoir or exhaust ports 370, 372 and 374 to the interior of the valve bore 338, thus communicating these ports with both motor passages 342 and 344 and also with the pump port 358. The boom structure drops quickly because of its own weight, and fluid is exhausted rapidly from the front ends of both motors. The control mechanism for the valve is best shown in Figs. 3 through 6. As generally outlined above, the desirable result sought to be achieved by the control mechanism centers mainly on the idea of arranging a control member for selective movement among three positions to control the valve member 334. Further than this, it is important that the control member be so arranged that it will not depart materially from its selected position as the boom structure raises and lowers, it being remembered that the control device 330 is carried by the fluid motor 216 which itself raises and lowers with the boom structure.

The upper portion of the left-hand upright support 120 carries a mounting pin 380 on a transverse axis just below the pivot 240. The pivots at 240 and 380 thus provide first and second pivots on vertically spaced apart parallel axes. The lower pivot 380 serves to mount an upright control member or lever 382, the lower portion of which is shaped as shown at 384 and provided with an adjustable stop 386, the purposes of which will presently appear. The control lever extends upwardly past the first pivot axis 240 and has an intermediate part affording a connecting pivot point 388 which, when the lever 382 is in its neutral position, is coincident with the pivot 240. The control lever has three positions; namely, neutral, raise, and lower, designated respectively by the letters N, R and L. These positions correspond in reverse order with the neutral, raise, and lower positions of the valve member 334. The reasons for reversing the arrangement will be discussed below.

Figure 3:
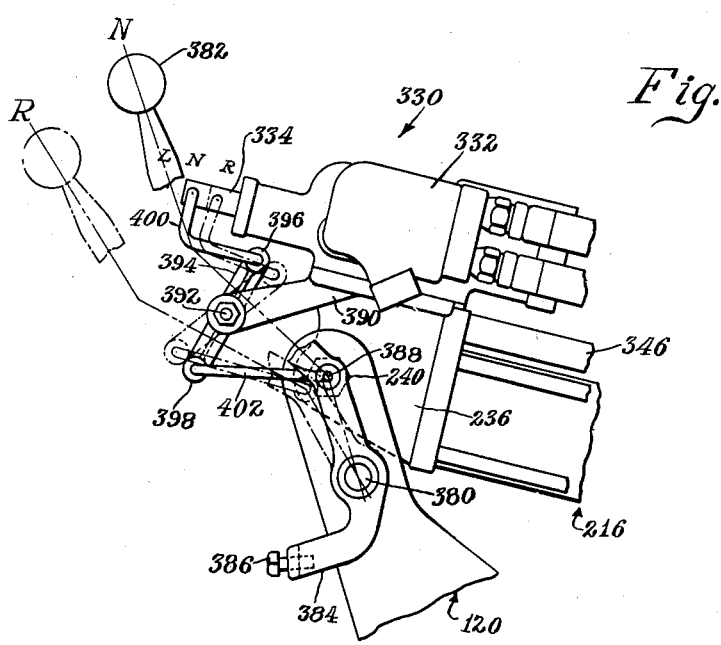

Fig. 3 shows the lowered positions of all the parts. The neutral position of the lever 382 is shown in full lines and the raised position of the lever is shown in broken lines. Since the control device 330 is carried directly by the rear end of the motor 216 it may be considered part of the motor, and a bracket 390 is rigidly fixed to the combined motor and valve housing and extends rearwardly to a point intermediate the valve member 334 and the main pivot axis 240, at which point it is provided with a third pivot 392.

A lever 394 is pivoted at 392 on the bracket 390 and has opposite ends 396 and 398 spaced equidistantly from the pivot or center 392. The upper end 396 of the lever 394 is connected by a bent link 400 to the rear end of the valve member 334. The lower end 398 of the lever is connected by a link 402 to the point 388 on the lever 382.

Omitting for the moment the precise geometry of the arrangement, it will be seen that angular adjustment of the lever 382 from its "N" position to its "R" position results in clockwise rocking of the lever 394 about its pivot 392. The interconnection at 400 between the lever 394 and the valve member 334 causes shifting of the valve member forwardly to its "R" position. At this point, the importance of the stop is emphasized. It will be seen that the points 398, 388 and 380 approach a straight line when the lever 382 is moved to its rearward or "R" position. Because of inherent looseness in the parts, it might be possible to force the toggle 398—388—388—380 over center. However, the stop 386 engages the rear edge of the upright support 120 and prevents this undesirable result.

Also of importance is the fact that the angular movement of the lever 382 from its "N" to its "R" position is relatively short. The point 388 travels on an arc about the center 380 through a relatively small angle. When the parts are in their full-line positions as shown in Fig. 3, the opposite ends 396 and 398 of the lever 394 are substantially equidistant from the coincident points 240 and 388. Since the bracket 390 is fixed, the pivot 392 is at a fixed distance from the pivot 240. Therefore, when the boom structure raises and the motor 216 and control device 330 pivot rearwardly about the point 240, the pivot 392 travels counterclockwise in an arc about the point 240. During downward travel of the bracket 390 about the point 240, the angle between the lever 394 and the bracket remains substantially the same, which means that the point 398 travels substantially in an arc about the point 240. However, the angle between the lever 394 and the link 402 will change and even though the point 398 departs slightly from a perfect arc about the point 240, the angle between the lever 394 and the link 402 becomes more acute, thus importing little if any direct force to the lever 382. Therefore, the lever 382 has but slight movement away from its "R" position. This movement is so small as to be, in effect, hardly appreciated by the operator.

The importance of the above arrangement will be apparent when it is considered what disadvantageous results would follow if the lever 382 were materially displaceable in its "R" position. In that event, the burden would be on the operator to "chase" the lever during raising movement of the boom structure. According to the present design, he merely pulls back on the lever and holds it as the boom structure raises. In this respect, the reversal of the movement of the valve member 334 and lever 382 is simply to provide for shifting of the lever 382 in a rearward direction as the boom structure moves upwardly, resulting in a more natural control which gives the operator adequate feel or touch.

Figure 4:
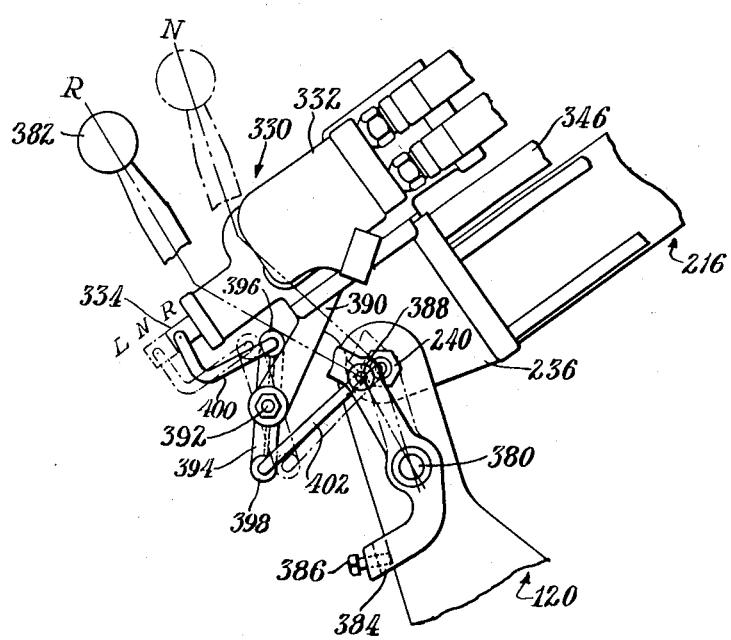

The foregoing desirable results are achieved also in the lowering of the boom structure. As indicated in Fig. 4, a return of the control lever from its "R" position to its "N" position restores the valve member 334 to its neutral position. Fig. 5 shows that the valve member 334 has been shifted rearwardly by a forward movement of the lever 382 to its "L" position. Again, the compensating and interconnecting linkage 394-400-402 keeps the lever 382 from departing materially from its selected position during lowering movement of the boom structure. It will be apparent in Fig. 5 that the angular movement in a forward direction of the lever 382 about its pivot 380 is somewhat greater than the rearward angular movement as indicated in Fig. 3. However, this becomes relatively unimportant, since the speed of drop of the boom structure is relatively rapid and nicety of control is not as important as in raising. Even so, the boom structure may be eased downwardly by movement of the lever 382 forwardly in small amounts. Again, the forward shifting of the lever 382 is consonant with downward or forward travel of the various components as the boom structure lowers.

Summary

The foregoing disclosure is, as previously stated, based upon a preferred embodiment of the invention for the purposes of efficiently achieving the desirable results as outlined above. The novel control mechanism is such that the operator has at his fingertips a simple and convenient control involving only a single lever selectively shiftable in opposite directions from a central neutral position. Under control of this single lever, the operation of the loader at maximum efficiency is easily effected.

Various other important features of the invention not specifically enumerated will undoubtedly occur to those versed in the art, as likewise will numerous modifications and alterations in the preferred embodiment of the invention, all of which may be achieved without departing from the spirit and scope of the invention as defined in the appended claims.

What is claimed is:

1. In a loader of the character described, the combination of: a support; a load-bearing element movably carried by the support for movement between raised and lowered positions; fluid power means connected between the support and element for effecting raising and lowering of the element, and including a fluid motor swingable on the support on a first transverse pivot; a control valve housing fixed to the motor above said first pivot, and having a valve part including a rear end portion projecting rearwardly of the first pivot and shiftable selectively forwardly and rearwardly relative to the housing for controlling the motor; a control lever pivoted to the support for adjustment selectively back and forth about a second transverse pivot below the first pivot and extending upwardly to a point coincident at times with the first pivot; a bracket fixed to the motor and having a third transverse pivot intermediate the first pivot and the rear end portion of the valve member; and means for shifting the control part by adjustment of the control member between its neutral and active positions and arranged so that raising of the aforesaid element is without substantial effect on the adjusted position of the control member, said means comprising a lever rockable on the third pivot and having upper and lower ends respectively above and below said third pivot, link means connecting the upper end of the lever to the rear end portion of the valve member, and link means connecting the lower end of the lever to the aforesaid point on the control member.

2. In an implement having a supporting frame and an element carried by the frame for vertical movement relative to the frame between raised and lowered positions, the combination of: power means connected to the element and pivoted on the frame on a first pivot for upward and rearward movement as the element raises and for downward and forward movement as the element lowers; a control device for controlling the power means and carried by the power means for movement therewith about said first pivot; a control part carried by the control device for movement bodily therewith but arranged for shifting forwardly relative to the control device to cause the power means to raise the element and for shifting rearwardly relative to the control device to cause the power means to effect lowering of the element; a control member pivoted on the frame on a second transverse pivot spaced from the first pivot and having a point thereon spaced from said second pivot a distance equal to the spacing between said pivots, said control member being angularly adjustable about the second pivot between a neutral position in which said point is coincident with the first pivot and an active position in which said point is spaced slightly behind said first pivot; and motion-reversing means connected between the control member and the shiftable part for effecting forward movement of said part in response to rearward adjustment of the control member, said means including a connection to the control member at said point thereon so that raising of the element is without substantial effect on the adjusted position of the control member.

3. In an implement having a supporting frame and an element carried by the frame for vertical movement relative to the frame between raised and lowered positions, the combination of: power means connected to the element and pivoted on the frame on a first pivot for upward and rearward movement as the element raises and for downward and forward movement as the element lowers; a control device for controlling the power means and carried by the power means for movement therewith about said first pivot; a control part carried by the control device for movement bodily therewith but arranged for shifting forwardly relative to the control device to cause the power means to raise the element and for shifting rearwardly relative to the control device to cause the power means to effect lowering of the element; a control member pivoted on the frame on a second transverse pivot spaced from the first pivot and having a point thereon spaced from said second pivot a distance equal to the spacing between said pivots, said control member being angularly adjustable about the second pivot between a neutral position in which said point is coincident with the first pivot and an active position in which said point is spaced slightly behind said first pivot; a bracket on the control device providing a third pivot swingable in an arc about the first pivot as the control device swings with the power means; and means for shifting the control part by adjustment of the control member between its neutral and active positions and arranged so that raising of the aforesaid element is without substantial effect on the adjusted position of the control member, said means comprising a lever pivoted intermediate its ends on the third pivot, a first link connecting one end of the lever to the shiftable control part, and a second link connecting the other end of the lever to the control member at said point.

4. The invention defined in claim 3, further characterized in that: the ends of the lever are equidistant from said third pivot and are also equidistant from said point on the control member when the control member is in its neutral position.

5. Control mechanism of the character described, comprising: a support; a controllable device carried by the support for swinging about a first pivot axis among any one of several positions of angularity relative to the support, and including a shiftable control part; a control member swingable back and forth on the support about a second pivot axis parallel to and spaced on the support from the first pivot axis and having a neutral position in which a point on said control member is coincident with said first pivot axis whereby said point travels in an arc about the second pivot axis when the control member is adjusted relative to said neutral position; and force-transmitting means interconnecting the shiftable part and the control member and having a pivotal connection to the control member at said point for enabling swinging of the controllable device without substantial effect on the neutral position of the control member.

6. Control mechanism of the character described, comprising: a support; a control valve housing carried by the support for swinging about a first pivot axis among any one of several positions of angularity relative to the support, and having a reciprocable valve member shiftable to either side of a neutral position; a control member carried on the support for angular adjustment about a second parallel pivot axis to either side of a neutral position in which a point on the control member is coincident with the first pivot axis so that said point swings on an arc about the second pivot axis and through the first pivot axis as the control member is adjusted; and link means connected at one end to the valve member and at the other end to the control member at said point for enabling swinging of the control valve housing without substantial effect on the neutral position of the control member.

7. Control mechanism of the character described, comprising: a support; a fluid motor carried on the support on a first pivot axis for swinging among any one of several positions of angularity relative to the support; a control valve housing carried by and bodily movable with the motor and including a valve member adjustable from a neutral position fixing the motor in one position to an active position for initiating swinging of the motor; and means for adjusting the valve irrespective of the angular position assumed by the motor and valve housing, including a control member carried on the support on a second pivot axis spaced from the aforesaid first pivot axis for movement from and return to a central position, said control member having a part movable therewith and so positioned thereon as to travel in a relatively small range proximate to said first pivot axis, and said means also including a force-transmitting element connected to the valve member and additionally having a pivotal connection to the control member part so that, upon swinging of the motor and valve housing in response to active positioning of the valve by active positioning of the control member, said pivotal connection enables relative pivotal movement between the valve and control members without causing said members to change their respective active positions.

8. Control mechanism of the character described, comprising: a support; a control housing carried by the support on a first pivot axis for swinging among any one of several positions of angularity relative to the support and including a shiftable part movable bodily with but relative to the housing selectively back and forth between neutral and active positions along a straight line spaced radially to one side of the first pivot axis; a control member carried on the support for angular adjustment between neutral and active positions about a second pivot axis spaced radially to the other side of the first pivot axis and arranged so that a point thereon travels in a relatively small range proximate to the first pivot axis; a bracket fixed to the control housing and providing a fixed third pivot axis intermediate said first pivot axis and the aforesaid straight line; and link and lever means connecting the shiftable part to the control member for enabling swinging of the housing and shiftable part without substantial effect on either the neutral or active positions of the shiftable part and control member, said link and lever means including a lever pivoted intermediate its ends on said third pivot axis and having its opposite ends of such length as to be equidistant from the aforesaid point when the control member is in its neutral position, a link element connecting one end of the lever to the shiftable part, and a link element connected to the other end of the lever and having a pivotal connection to the control member at the aforesaid point.

No references cited.